United States Patent [19]

Sisler

[11] Patent Number: 4,969,728
[45] Date of Patent: Nov. 13, 1990

[54] METHOD FOR COSMETIC TREATMENT OF SUNKEN EYE TISSUES

[76] Inventor: Hampson A. Sisler, 34 W. 12 St., New York, N.Y. 10011

[21] Appl. No.: 343,061

[22] Filed: Apr. 25, 1989

[51] Int. Cl.⁵ .............................................. G02C 7/02
[52] U.S. Cl. ...................................... 351/41; 351/175; 351/246
[58] Field of Search ................. 350/436, 145; 351/41, 351/175, 246

[56] References Cited

U.S. PATENT DOCUMENTS 1,144,853  6/1915  Laisne ................................. 351/175
3,914,031 10/1975  Sisler ..................................... 351/41

Primary Examiner—Rodney B. Bovernick
Attorney, Agent, or Firm—Kane, Dalsimer, Sullivan, Kurucz, Levy, Eisele and Richard

[57] ABSTRACT

A device and method is disclosed for cosmetically correcting a shrunken eye condition in a patient. The invention provides a cylindrical lens in front of the eye which projects an image of the tissue ahead of the actual tissue position. Since the shrunken tissue appears to be closer to the anatomically correct position, the patient has a more aesthetically pleasing appearance.

5 Claims, 2 Drawing Sheets

METHOD FOR COSMETIC TREATMENT OF SUNKEN EYE TISSUES

BACKGROUND OF THE INVENTION

This invention pertains to the cosmetic treatment of sunken eye tissues.

Frequently, victims of accidents and other persons suffer from a condition in which at least one eye and/or tissues around the eye are displaced inwardly with respect with the rest of the victim's face. This condition can also occur in situations were the victim is provided with a prosthetic device for replacing an eye. This type of condition is frequently called a sunken eye. While the person may be able to function normally with this condition, the sunken eye gives the person an aesthetically displeasing appearance.

OBJECTIVES AND SUMMARY OF THE INVENTION

An objective of the present invention is to provide a method for eliminating or at least reducing the aesthetic effects of a sunken eye of a victim.

A further objective is to provide a device which can be used to compensate cosmetically for shrunken eye tissues.

Another objective is to provide a device which can be incorporated into or made integrally with eye glasses used to correct other eye problems.

Other objectives and advantages of the invention shall become apparent from the following description of the invention. Briefly, in accordance with this invention, a person suffering from a sunken eye condition, is provided with a lens which has optical characteristics selected for generating an image of the eye tissues to a position closer to their normal, anatomical position. Each such lens is selected based on the physical dimensions of the affected tissues. For tissues which have an offset from the normal positions relatively evenly, a planoparallel lens may be used. Other types of lens may be used for tissues which are unevenly displaced.

DETAILED DESCRIPTION OF THE INVENTION

Figure 1:
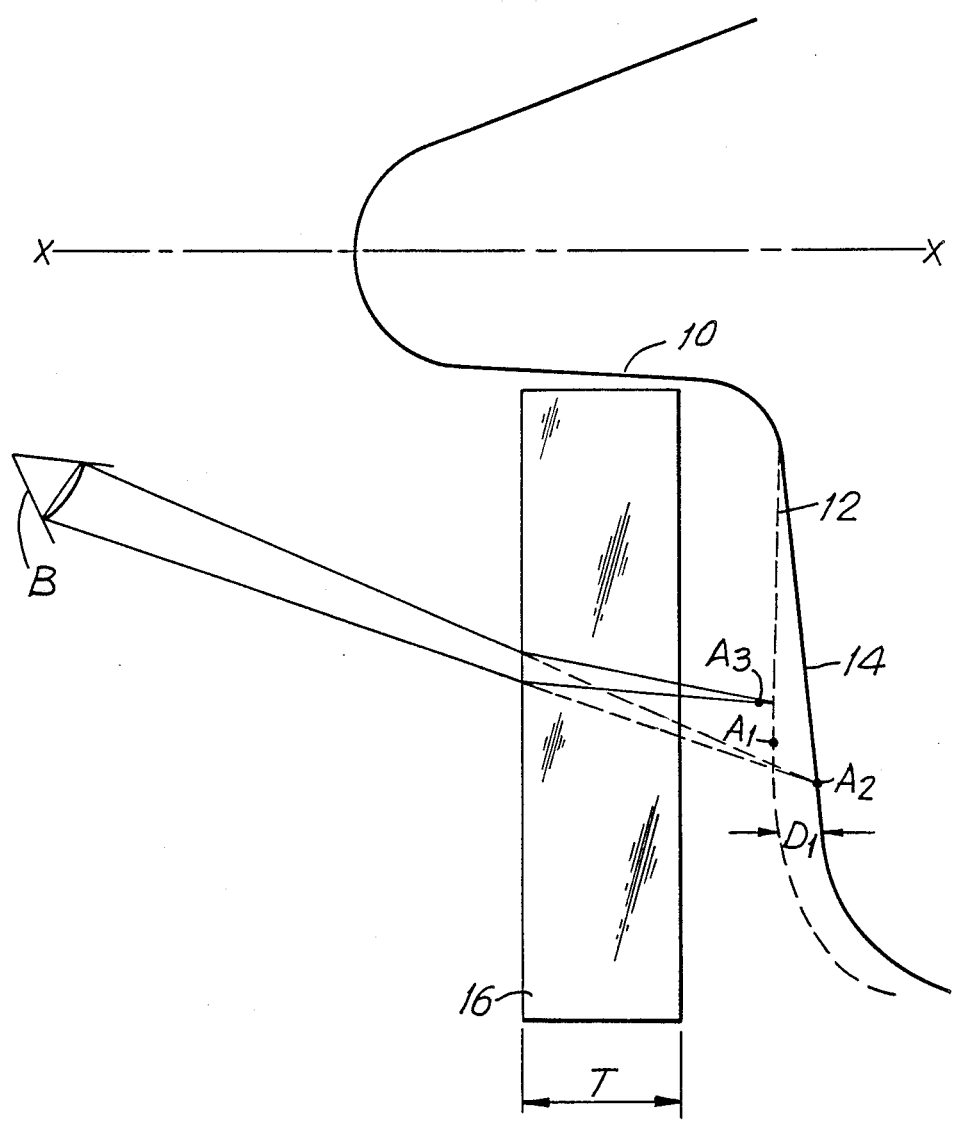
FIG. 1 shows the operation of a planoparallel lens in accordance with this invention.

In FIG. 1 the numeral 10 indicates a partial outline of a person's head viewed from the top. In the area of the eye, the normal position of the tissues is indicated by dashed line 12. However, in this case, the tissues have shrunk back to the position indicated by solid line 14. Thus a point which may be disposed for example on the person's eye lid is normally disposed anatomical at position A1. However, because of the sunken eye condition, this point has been drawn back to a position A2.

In order to compensate cosmetically for this shift, according to the present invention, the person is provided with a lens 16, which in FIG. 1 is a planoparallel lens, disposed in front of the sunken eye tissues. This lens operates as follows. A person B looking at the face of person 10 without the lens will see for example the eye lid at position A2. Since the normal position of the eye lid is A2, the aesthetic appearance of person 10 is displeasing. However if person 10 wears a lens 16, for person B, the image of the eye lid is moved from A2 to A3 by the lens. Position A3 is very close to the anatomically correct position A1 and therefore person 10 has a more acceptable and therefore pleasing appearance.

Figure 2:
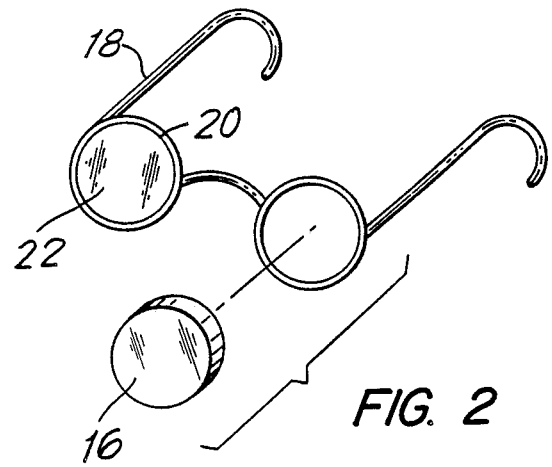
FIG. 2 shows an isometric view of a pair of eye glasses with the planoparallel lens of FIG. 1.

The distance between position A2 and image A3 is determined by the optical characteristics of the lens. Therefore the doctor prescribing the lens 16, first determines the distance D1 between the correct position A1 and the actual position A2. The physician then determines the size and the thickness T of lens 16 for obtaining the image at A3. The dimensions may be easily calculated from Snell's law. Preferably lens 16 is incorporated in a regular pair of eye glasses 18 as shown in FIG. 2. The eye glass may have a second lens 22 which may be plane or it may be a lens provided for correcting defects of the person's other eye. Furthermore, if the eye corresponding to lens 16 is still functioning but may need some optical corrections, the lens 16 may be further shaped to provide these corrections. For example, the lens may be shaped to correct for farsightedness, nearsightedness, etc. The lens may also be shaped further for other cosmetic corrections, for example by providing it with a fixed prism to reposition the eye, by providing it with plus or minus refraction lenses to correct enlarged or reduced eyes, etc.

Figure 3:
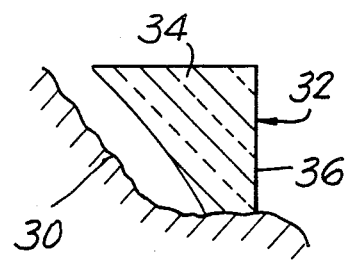
FIG. 3 shows a lens for compensating uneven tissues around an eye.
Figure 4:
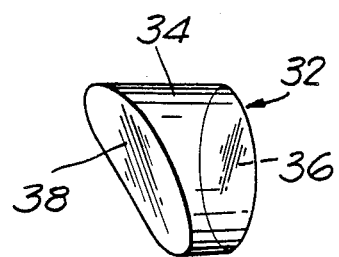
FIG. 4 shows an isometric view of the lens of FIG. 3.

As shown in FIG. 1, frequently, the tissues do not shrink along a line parallel with an axis X-X going through the center of the person's head but rather they shrink gradually with points disposed closer to the nose experiencing less shrinkage then tissues further away from the nose. Thus, point A2 is not only behind point A1 but is also offset laterally. In FIG. 1, some but not all this lateral offset has been compensated. For relatively small shifts, image A3 is sufficiently close to point A1 so that the remaining lateral offset can be ignored. However for larger shifts a different type of lens is preferable. In FIG. 3, tissue 30 of a person has undergone a much more drastic shrinkage than in FIG. 1. For this situation, an angled lens 32 is used. As shown more clearly in FIG. 4, lens 32 has a cylindrical wall 34 terminated by a first end wall 36 and a second end wall 38. Preferably end wall 36 is substantially perpendicular to wall 34. However, end wall 38 is preferably disposed in a plane which is at an acute angle with respect to side wall 34. The angle of end wall 38 and the distance between the end walls is selected to match the shrinkage of tissue 30. Furthermore, lens 32 also corrects lateral displacement better.

The forward placement of the patient's eye anatomy, as seen through the cosmetic lens, is proportional (according to Snell's Law) to it's thickness and the optical density of the transparent material from which it is made. A typical quantification will be about one-third of said thickness. In other words, if the cosmetic lens is one centimeter in thickness, the apparent forward placement of the eye, as viewed, will be 3.33 mm. Hence, if the eye is sunken to that degree, it will appear to be in the normal position, depth-wise, as seen by the viewer/observer.

Obviously, numerous modifications may be made to the invention without departing from its scope as defined in the appended claims.

I claim:

1. A method of cosmetically correcting a sunken eye condition in a patient, comprising the steps of:
    determining the displacement between the actual position of the sunken eye and the anatomically correct position of said eye; and
    positioning a lens in front of said sunken eye, said lens having a thickness selected to correspond to said displacement.

2. The method of claim 1 further comprising the step of disposing said lens in an eye glass frame.

3. The method of claim 1 further comprising the step of shaping the lens for other corrections of said eye prior to positioning said lens.

4. The method of claim 3 wherein said lens is shaped for correcting optical characteristics of the eye.

5. The method of claim 3 wherein said lens is shaped for correcting cosmetic characteristics of said eye.

* * * * *